United States Patent
Gottlieb et al.

[11] Patent Number: 5,774,532
[45] Date of Patent: Jun. 30, 1998

[54] SINGLE NETWORK RECORD CONSTRUCTION

[75] Inventors: Louis G. Gottlieb; Isaac K. Elliott, both of Colorado Springs; Kevin R. Witzman, Monument, all of Colo.

[73] Assignee: MCI Corporation, Washington, D.C.

[21] Appl. No.: 426,257

[22] Filed: Apr. 21, 1995

[51] Int. Cl.[6] .................................................. H04M 15/00
[52] U.S. Cl. .............................. 379/11; 379/112; 379/113
[58] Field of Search ................................... 379/1, 13–16, 379/34, 111–115, 119, 121, 207, 219, 220

[56] References Cited

U.S. PATENT DOCUMENTS

| | | | |
|---|---|---|---|
| 3,560,658 | 2/1971 | Molloy et al. | 179/7.1 |
| 4,009,346 | 2/1977 | Parker et al. | 179/15 |
| 4,464,543 | 8/1984 | Kline | 379/16 |
| 4,500,960 | 2/1985 | Babecki et al. | 364/200 |
| 4,878,240 | 10/1989 | Lin et al. | 379/201 |
| 4,958,341 | 9/1990 | Hemmady et al. | 370/60.1 |
| 4,977,582 | 12/1990 | Nichols et al. | 375/118 |
| 4,979,118 | 12/1990 | Kheradpir | 379/220 |
| 5,003,584 | 3/1991 | Benyacan | 379/119 |
| 5,048,079 | 9/1991 | Harrington | 379/112 |
| 5,159,698 | 10/1992 | Harrington | 379/112 |
| 5,333,183 | 7/1994 | Herbert | 379/112 |
| 5,517,560 | 5/1996 | Greenspan | 379/114 |

Primary Examiner—Curtis Kuntz
Assistant Examiner—Vijay Shankar

[57] ABSTRACT

Call records are generated from various network elements processing a call. A consolidation feed acts as a concentrator for the various records. However, since the concentrator receives the call records at different times, the invention provides a concentrator with a count of the various types of network elements which have processed the call. This allows the concentrator to match and merge the records once all the records, indicated by the final count, have been received. In order to update the count as a call progresses from network element to network element, the originating network element creates a buffer which is carried through the network, from element to element. As each element is affected, it adds a count to the buffer.

10 Claims, 10 Drawing Sheets

FIG. 1
PRIOR ART

GLOSSARY OF ABBREVIATIONS

| | |
|---|---|
| ADF | Application data field |
| AP | Adjunct Processor |
| API | Application programming interface |
| BDR | Billing data record |
| CDR | Call detail record |
| CR | Call record |
| DAP | Data access point |
| DBMS | Database management system |
| E/P/EP | Extended/private/extended private |
| GSL | Generalized statistics library |
| IPC | Inter-process communication |
| LSE | Local support element |
| MOSR | Matched operator service record |
| NER | NIC event record |
| NIC | Network information concentrator |
| OS level | Operator Service Level |
| OSR | Operator service record |
| SER | Switch event record |

SINGLE NETWORK RECORD CONSTRUCTION

FIELD OF THE INVENTION

The present invention relates to telephone network call record processing, and more particularly to the creation of a data buffer to be commonly shared by switches and other network elements processing a call.

RELATED APPLICATIONS

The present invention relates to co-pending patent application 08,426,256.

BACKGROUND OF THE INVENTION

In major telephone networks, such as the MCI network, a particular Telephone call can traverse many different platforms, from call origination point to destination. Each platform originates call records, but at the input of downstream applications, such as bill processing, there must be a way of determining when all the call records from the various platforms have been received so that the call may be billed.

In recent years, MCI's Intelligent Network has been growing by leaps and bounds. The number of subscribers of major services, such as 800 number, 900 number and Vnet continues with double digit growth, and newer services such as Operator Services (OS) and Enhanced Voice Services (EVS) have been added to the network. As the population of Intelligent Network platforms increases, there is an increased need for a capability in the network that can view a network transaction as a whole, namely, a capability that can monitor a call from one end of the network to the other by tracking the network event information generated by each of MCI's platforms.

Figure 1:
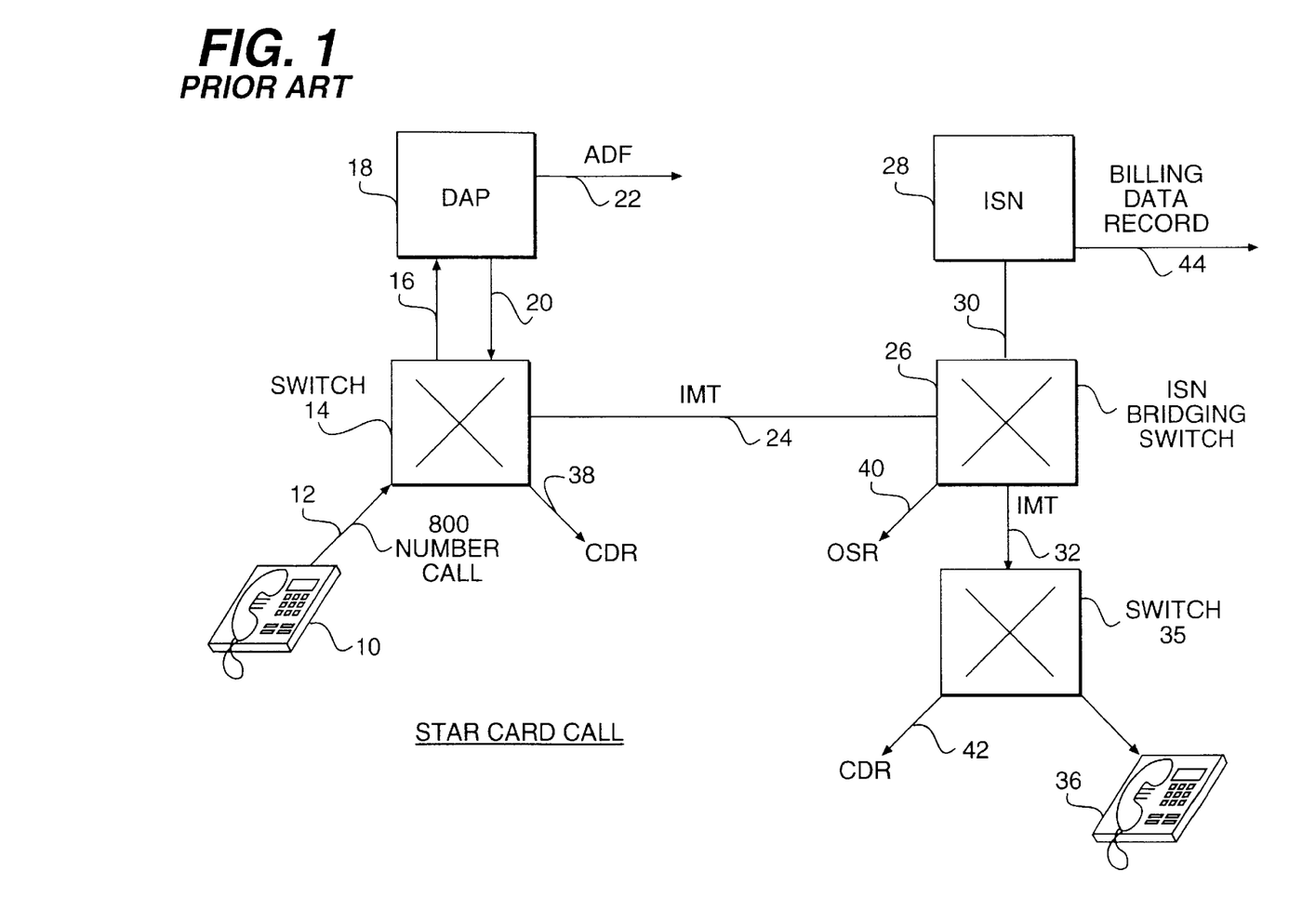
FIG. 1 is a block diagram of prior art architecture.

FIG. 1 indicates the prior art approach for handling a call processed by a number of platforms. The Star Card is a service of MCI which combines credit card charging with the ability to access a menu for enhanced services, such as auto-dial, access to a weather report, etc. FIG. 1 is a block diagram showing the basic data flow of a Star Card call.

In the figure, an originating call is indicated at phone 10, which is assumed, for this discussion, to be an 800 number call. The call is transmitted, along line 12, to a network switch 14. The switch generates an 800 number translation ADF request, along line 16, to DAP 18. The DAP is a service control point which controls the routing of the call, as disclosed in U.S. Pat. No. 5,095,505 issued on Mar. 10, 1992. A response is fed back, along line 20, from the DAP 18 to switch 14 so that a voice inter-machine trunk (IMT) 24 may be established to the ISN bridging switch 26. The Intelligent Services Network (ISN) 28 is an operator platform, which communicates with the bridging switch 26 over line 30, to communicate voice signals from the trunk 24 to the inter-machine trunk 32, via switch 26. A final switch 35 transfers the voice communication to a termination point, such as phone 36. What is important to note is that, at the completion of a call, four call records are generated at different points in the network, namely, Call Detail Records (CDRs) 38 and 42, Operator Service Records (OSRs) 40, and Billing Detail Records (BDRs) 44. In billing applications, several of these records must be matched and merged, such as BDR at 44 and OSR at 40. A fifth record is the paired application data field (ADF) switch to DAP request 16 and DAP to switch response 20 (the request and response being paired to form a single record), resulting from the dialing of an 800 access number for Star Card use. The DAP translates the 800 number dialed and sends a response to the originating switch 14 with a terminating address at the switch 35. In order to obtain a comprehensive view of how this call traverses the network, one must collect all five of the records mentioned above, and match them to each other. Before the present invention, there was no way of determining which platforms were involved with a particular call, and what information the platforms added to the call. Any sort of consolidating feed of the records has no means of determining how many records are involved in a particular call. The end result is limited capability of the network.

BRIEF DESCRIPTION OF THE PRESENT INVENTION

The present invention makes it possible to obtain a comprehensive view of how a call traverses a network. Specifically, means are provided for collecting all five of the call records discussed above, and matches them to one another. This record matching capability, and the modifications that are necessary in the MCI network, in order to achieve efficient record matching, are the focus of the invention. Record matching is necessary to support billing and network monitoring/network management applications. The following highlight several examples.

The billing for Intelligent Services Network (ISN) usage is record intensive. It is necessary to match operator service records (OSRs) generated at a switch, with billing detail records (BDRs) generated at the ISN platform. The OSR contains the time points for call duration, and the BDR contains the detail information on what actions the operator took on behalf of the customer. Both are needed for billing a call.

Network monitoring of calls from one end of the network to the other requires detailed tracking of calls. One example of this requirement is the Intelligent Call Routing (ICR) service of MCI. For example, it would be desirable to do real time load balancing to route 800 number calls to a set of terminating addresses only when agents at each terminating address are available to answer the call, even when a customer has no Automatic Call Distributor (ACD) equipment. In order to do that, the MCI network must track the calls in progress to each of the load balanced terminating addresses. To accurately track the call in progress, all switch—DAP ADF request/response pairs must be collected at a single system that tracks where the call was routed. Later, when the call detail record (CDR) is created, the tracking system will know the call has been terminated, and the terminating address is available to accept another call.

Networks such as those of MCI are charged by local exchange carriers (LECs) for access to local lines. MCI must ensure that it is being properly billed by the LEC for the appropriate services provided. In order to trace charges, it is necessary to match originating switch call records with tandem and terminating switch call records across the network.

The prior art network components shown in FIG. 1 operate in accordance with an industry-wide standard known as the SS7 Protocol. This protocol provides for a user-definable field. The present invention more fully employs user-definable field sections as a data buffer for different types of records. The buffer accumulates counts in its various sections as a call traverses the network. As each platform touches the call, there is an incrementing of the buffer section relating to that platform. Typically, the buffer sections are divided to correspond with a switch buffer, DAP buffer, etc. When a call is answered at the termination, or is busy, a call disposition message is sent out by either originating or terminating switches, which indicates to a downstream consolidation device just how many records to expect for this particular call. This allows the consolidation device to determine when all the records to be collected have been generated. The end result is a single billing record for the entire call.

Further, the buffers are useful for debugging purposes. That is, the various buffer sections permit one to determine where a call went and under what circumstances it was routed to certain places.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 4:
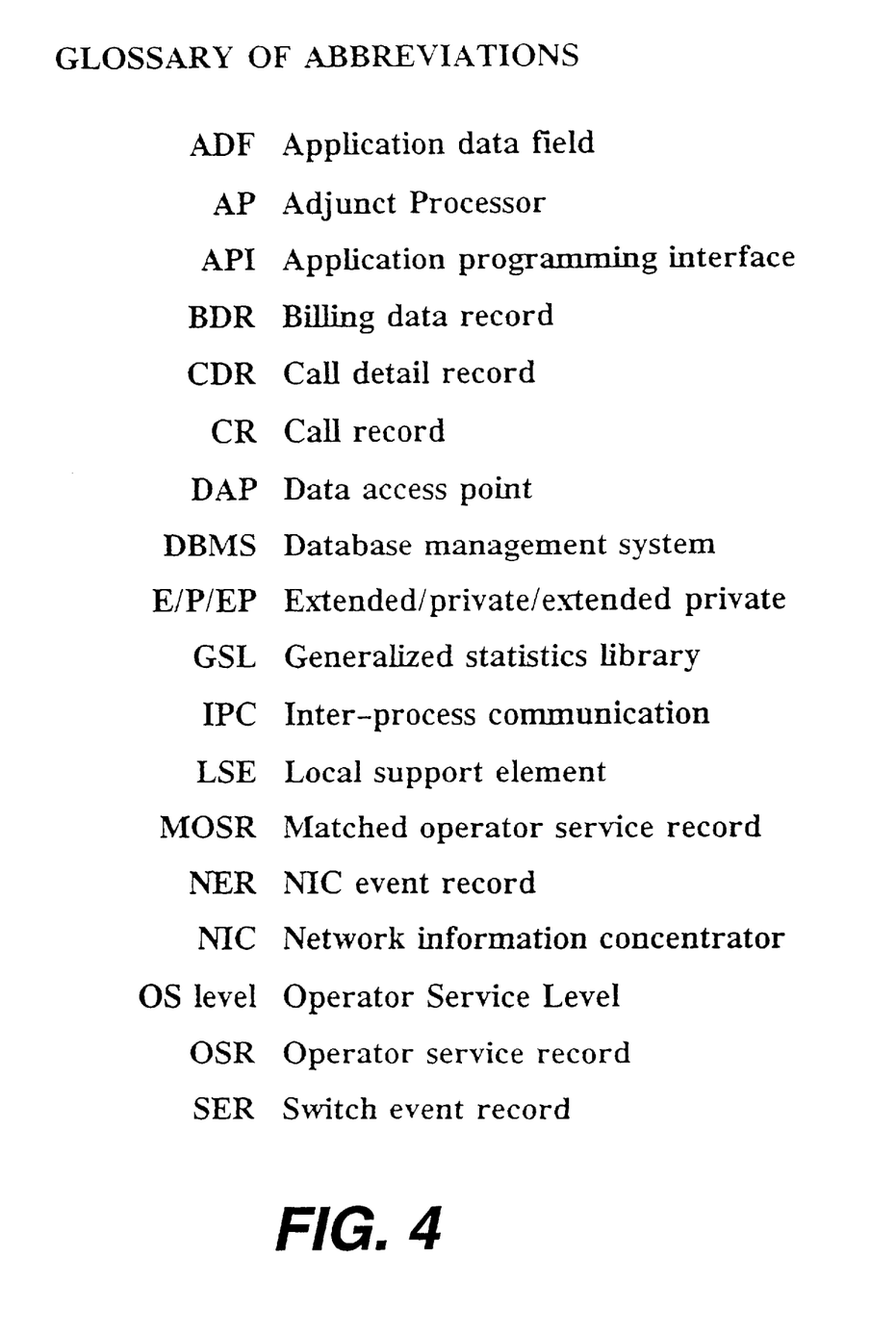
FIG. 4 is a glossary of abbreviations.

A glossary of abbreviations appears in FIG. 4.

The individual components indicated in FIG. 1, and discussed in connection with the Brief Description Of The Prior Art, are employed in the present invention along with significant improvements. The previously discussed SS7 Protocol user-definable field is employed as a buffer containing various sections. For example, section 1, having byte 1, may relate to switch records such as those generated by switch 14, 26 and 35. A second buffer section may have byte 2, which relates to the ADF 22 of the DAP 18. A third buffer section may have a third byte corresponding to the billing data record generated by ISN 28. A respective byte is incremented each time a corresponding platform or switch generically referred to as network elements becomes involved in the routing of a call between the origination 10 and the termination 36.

Considering a normal call transfer, in FIG. 1, between origination 10 and termination 36, the first buffer is incremented when switch 14 switches the call. The DAP 18 is immediately involved for routing purposes, and the second byte of the buffer, relating to the DAP, is incremented by one. The signalling is then transferred from switch 14 to switch 26, which increments the first buffer section, namely, the first byte. The incrementing of the first buffer again occurs when switch 35 receives signals from switch 26. Likewise, the platform, ISN 28, causes the incrementing of the third byte of the buffer, corresponding to a third buffer section. Each incrementing of a byte in a corresponding buffer section indicates that an additional record has been generated.

When a termination point such as phone 36 picks up the call, switch 35 receives an answer supervision message, and the switch establishes a voice channel separate from the previous signalling, which constitutes out of band signalling. The various incremental counts in the buffer are passed back to the origination switch 12 which issues a call disposition message. The call disposition message may be sent to a consolidation device which will then know how many call records have been involved during the transfer of the call. When those call records have been received by the consolidation device, it can complete a match/merge process of the records for utilization by downstream applications, such as billing and fraud analysis, and statistics analysis.

It should be mentioned that the DAP ADF record on line 22, dealing with routing information of a call, is generated at the beginning of a call. A billing data record (BDR) is generated by the ISN platform, and it generally relates to operator service information, which is also generated at the beginning of a call. However, switch records, such as the CDRs on lines 38 and 42, as well as the operator service record (OSR) generated on line 40, are generated at the end of a call.

Network Requirements For Record Matching

The present invention offers an efficient record matching system which solves two basic problems:

It must have a unique identifier for each network transaction which is attached to every network event record (NER) pertaining to that network transaction. In the example given in FIG. 1, a number of different records, of this type, was produced. These include the switch to DAP request and DAP to switch response on lines 16 and 20. Further, there are the switch records (CDR and OSR) produced by the switches 14, 26 and 35. ISN 28 produces a billing data record.

Each of these network events must contain the same Network Call Identifier in order for the records to be successfully matched by a record-matching system. The call identifier is produced on the first network element to participate in the network transaction, in this case, as part of the switch bill record of the originating switch 14. The call identifier is passed to each of the other network elements that participate in the network transaction, so that they can place the ID in their network event records as well. In this example, the originating switch 14 passes the call ID to the DAP 18 and sequentially thereafter to switch 26, ISN 28, and to the terminating switch 32. Each network event will also have a sub-record identifier indicating whether it is the fist, second, third, fourth, etc. network event associated with the network transaction.

The second requirement for an efficient record-matching system is the ability for the record-matcher to know when it is finished, when no more records are expected which belong to the same network transaction. The record matching system must know when it has all the network records. Without this capability, the record-matching system may have to wait until the maximum call duration (120 days) has passed before being certain that no more records will arrive for further matching.

The record-matcher must receive information in one of the network events which indicates the number of call records to expect for the network transaction from each network element type. The proposed special network event which contains the record counts for each type of record is called a call disposition message, and is cut by the originating switch when the call is over.

Examples of data fields and their sizes for a Network Call Identifier referred to above are shown below.

| Field | Size |
| --- | --- |
| Originating Switch ID | 14 bits |
| Originating Trunk Group | 14 bits |
| Originating Port | 19 bits |
| Call Attempt Timepoint | 32 bits |
| Sequence Number | 3 bits |

Table I. Format of the Network Call Identifier

The switch 14 will also send the Call Identifier to the DAP 18 as part of any Application Data Field (ADF) request 16, thereby automatically stamping every DAP request/response (16, 20) with the identifier. The Call Identifier is propagated into the Billing Detail Records of the ISN 28 as well. It is anticipated that, as more technically advanced equipment is incorporated into a network, the Network Call Identifier will migrate to a different format.

The Call Disposition Message must be produced by the originating network element when the call is over. An example of its format is given below.

| Field | Size |
| --- | --- |
| Network Call Identifier | 16 bytes |
| Call Disposition Code | 2 bytes |
| Answer Timepoint | 4 bytes |
| Actual Terminating Address | 8 bytes |
| Number of Data Elements | 2 bytes |
| Repeating Data Element (maximum 36 data elements) | |
| Record Type | 2 bytes |
| Record Count | 1 byte |

Table 2. Call Disposition Message Format

In the above message format, the call disposition code is indicative of the type of disposition encountered by the call (e.g., busy, blocked, etc.). The answer timepoint occurs when out band signaling is completed to the termination, and answer supervision occurs. The actual terminating address is the final destination 36 (FIG. 1). The number of data elements relates to the number of byte fields discussed in connection with the various network elements of FIG. 1. In the example of that Figure, the number of data elements was three. As indicated in Table 2, the message format includes the record type, which is elaborated upon in connection with Table 3.

| Record Type Value | Record Type |
| --- | --- |
| 0 | Switch Billing Record (CDR, PNR, OSR, etc.) |
| 1 | Switch/DAP Application Data Field pair |
| 2 | ISN Billing Detail Record |
| 3 | EVS Call Event Record |

Table 3. Record Types

The Call Disposition Message serves two purposes:

It informs the record merging system how many records to expect to match for a particular transaction. This information is contained in the Record Type/Record Count section of the message (Table 1).

It informs network monitoring systems of the call disposition. This information is contained in the Call Disposition Code.

Preferred Implementation

In a preferred embodiment of the present invention, a record consolidator, in the form of a Network Information Concentrator (NIC) 34, is included in the network with the task of matching network events from across the network, and providing matched records to client systems. The NIC 34, the subject matter of the above-identified related co-pending application, has the task of matching network events from across the network and providing matched records to client systems. In essence, the NIC 34 will be a system for constructing single network records. A detailed explanation of the NIC 34 appears later in this description.

A Call Disposition Message contain counts of each type of record produced by network platforms that participate in a call. These counts must be accumulated by the switches as the call progresses. To describe the system operation, we may trace an 800 number call that uses the Enhanced Voice Services (EVS) platform of the MCI network. The EVS platform is of the type which may present a voice menu to the caller which enables the caller to access various databases. This is a conventional technique for automated inquiries of bank and credit card accounts. To trace the count accumulation, reference is made to FIG. 2A, wherein a first portion of handling an EVS call is illustrated. The Figure illustrates the front end section of the system illustrated in FIG. 1, with the addition of the NIC 34 for receiving the ADF pair appearing at the output line 22 of DAP 18.

Figure 2A:
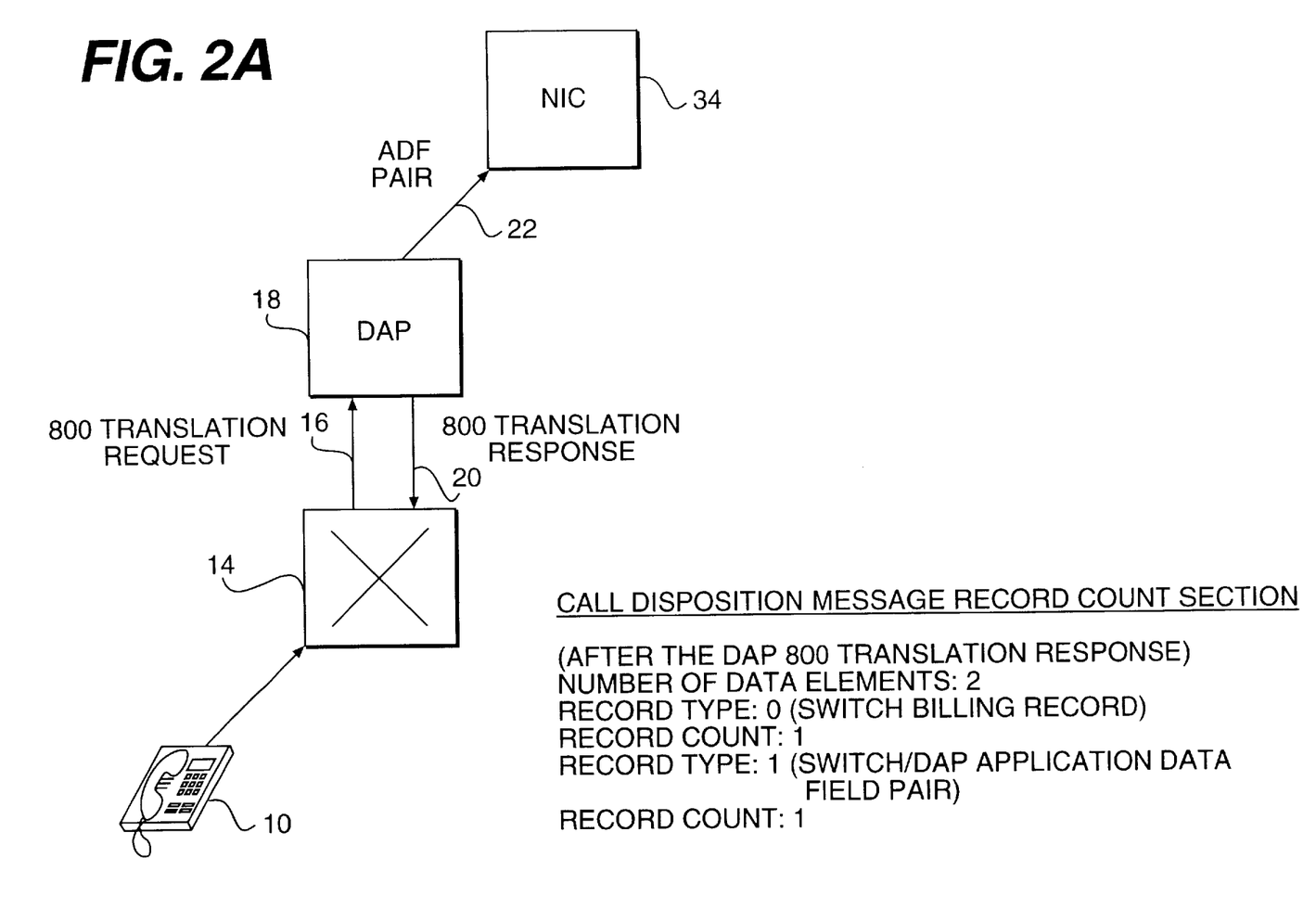
FIG. 2A is a block diagram of that portion of the present architecture involved in a first step of generating a Record Count Section of a Call Disposition Message.

An initial step of the call starts with the caller dialing an 800 number. The call reaches MCI switch 14, and immediately, the switch creates a buffer, as previously described, and to be referred to hereinafter as a Record Count Section that will become part of the Call Disposition Message. The switch immediately populates the Record Count Section with a count of one for the Switch Billing Record, as indicated in the tabulation shown in FIG. 2A, anticipating the call record that the originating switch 14 will cut at the end of the call. The originating switch then launches an 800 translation request on line 16 to the DAP 18, and attaches the Record Count Section in the request. The DAP translates the 800 number into a terminating address at an EVS platform, and then modifies the Record Count Section by adding a count of one to the application data field pair, as indicated in the tabulation shown in FIG. 2B. The DAP then sends the ADF 800 translation response back to the switch 14, attaching the now-modified Record Count Section. FIG. 2A shows the Record Count Section as sent by the DAP and received by the originating switch.

Figure 2B:
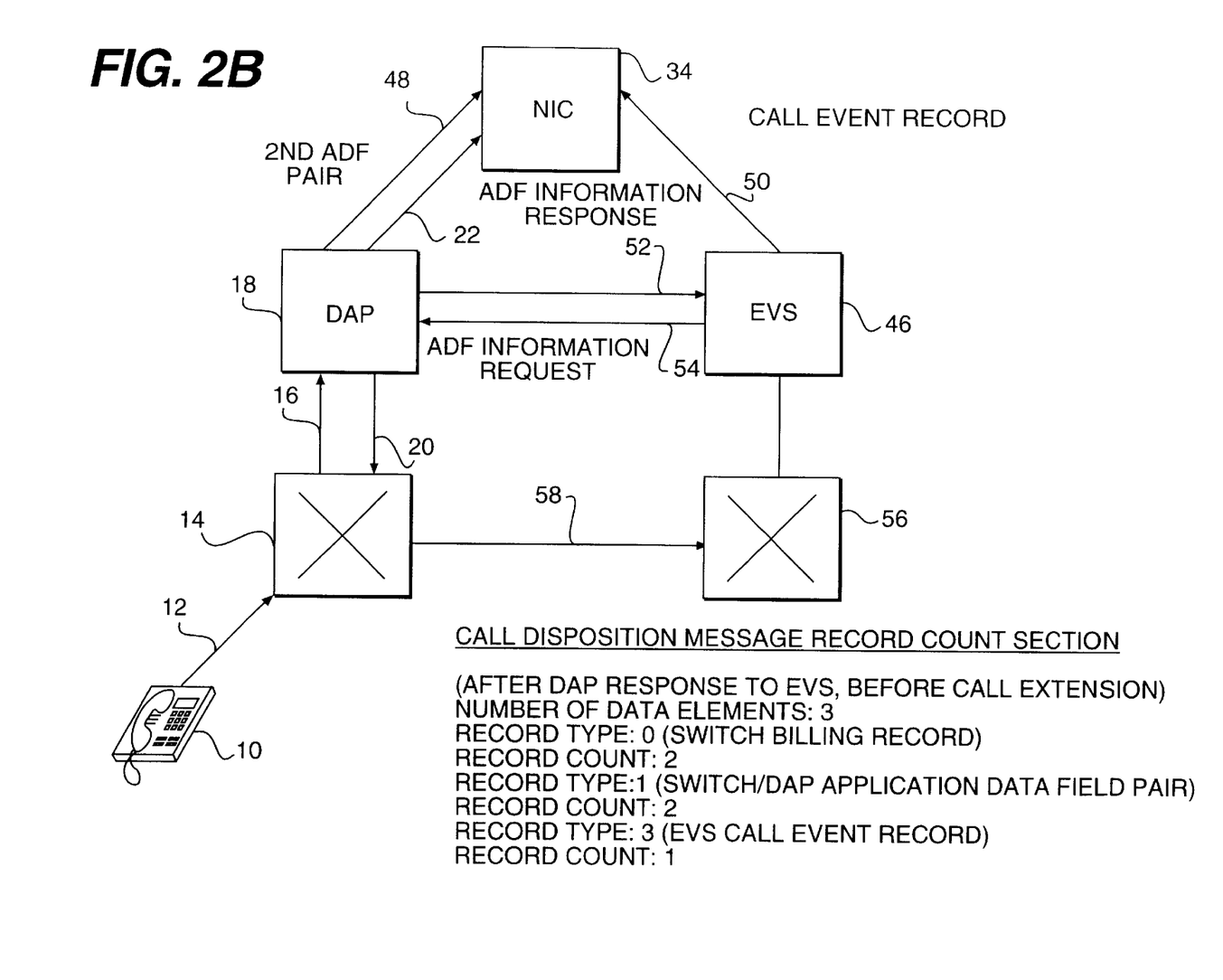
FIG. 2B is a block diagram of that portion of the present architecture involved in a second step of generating a Record Count Section of a Call Disposition Message.

Referring to FIG. 2B, after receiving the DAP routing response, the originating switch 14 routes the call, over line 58, to a switch 56 that is co-located with an EVS platform 46. As the standard protocol SS7 signalling is performed between the originating switch and the EVS switch 56, the originating switch transmits the Record Count Section to the EVS switch 56. Once the EVS switch receives control of the call, it modifies the Record Count Section by adding one to the count of Switch Billing Records for the call, anticipating the call record that will be cut at switch 56.

The switch 56 allocates a voice path to the EVS platform 46, and signals the EVS with the Record Count Section. The EVS platform plays a voice script, and the caller enters preselected DTMF digits in response. The EVS platform launches a DAP information request with the DTMF digits, and sends the Record Count Section to the DAP. The DAP translates the DTMF information digits, increments the count upwardly of ADF records in the Record Count Section, and sends the translation and the modified Record Count Section back to the EVS platform. The EVS platform modifies the Record Count Section to set up the count of EVS Call Event Records (ECR) to one, and then extends the call to the eventual terminating address.

Figure 3:
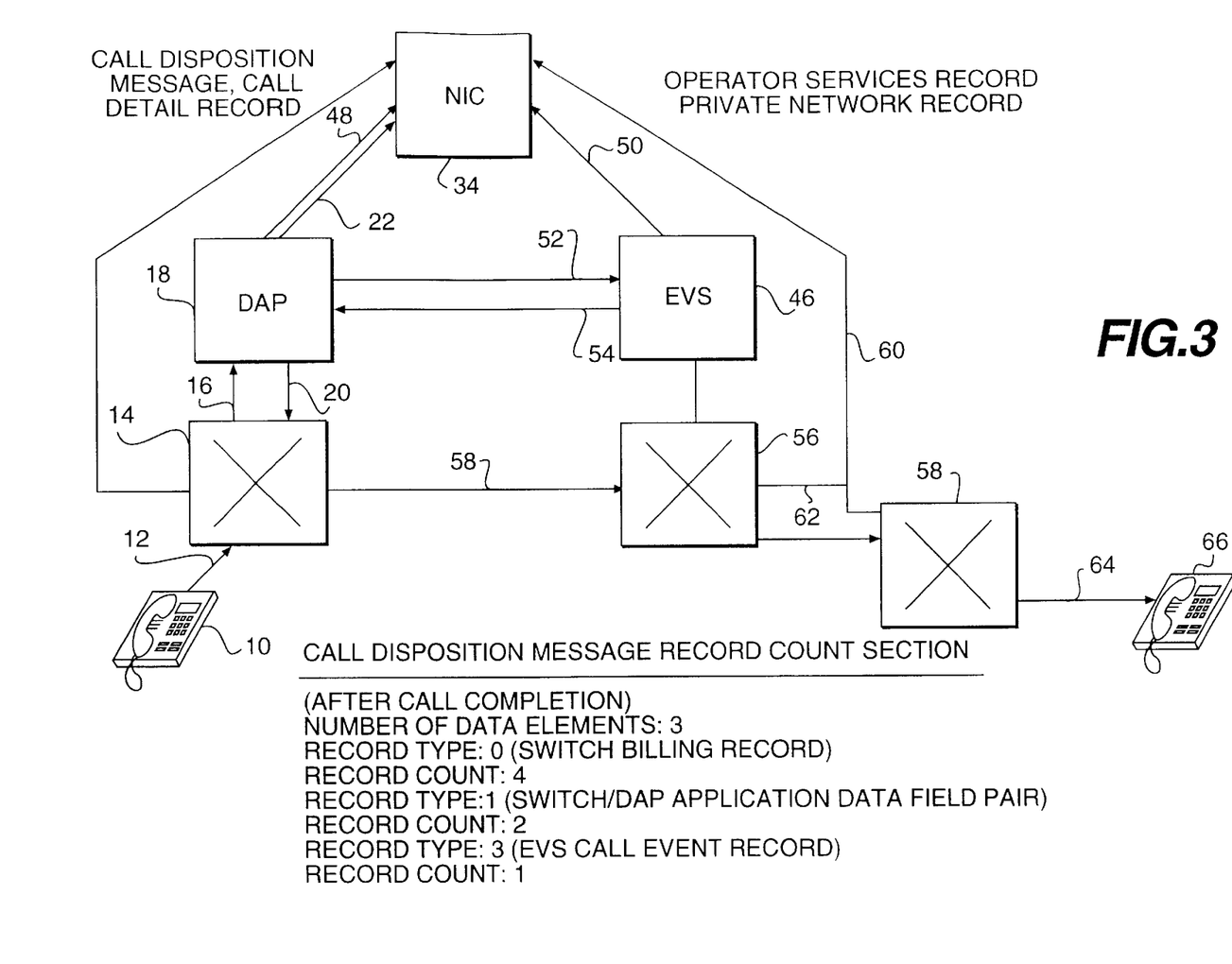
FIG. 3 is a block diagram of that portion of the present architecture involved in a third step of generating a Record Count Section of a Call Disposition Message.

Referring to FIG. 3, the third step in the processing of the 800 call that uses the EVS platform is illustrated. The switch 56 extends the call to a terminating switch 58, and, at the same time, transfers the Record Count Section to the terminating switch. The terminating switch immediately modifies the Record Count Section to add one to the count of the Switch Billing Record, anticipating the call record that will be cut at the terminating switch. This is indicated in the tabulation shown in FIG. 3. The call is completed to a direct access line 64 connected to the termination point 66, and the terminating switch 58 then populates the rest of the Call Disposition Message, including the Call Disposition Code (set to Answered) and the answer timepoint. After the call is over, the Call Disposition Message information is sent to the originating switch 14, and the originating switch sends the Call Disposition Message to the NIC 34 along line 60. Afterwards, when a caller hangs up the call is disassembled, and all three switch records are cut and sent to the NIC 34. Special records, such as operator service records (OSR) and private network records (PNR) are transmitted from switch 56 to the NIC 34, via lines 60 and 62. Since the NIC already has received the Call Disposition Message, the NIC expects to receive three Switch Billing Records for the example discussed. Once these records are received, the NIC matches all of the records and sends the single network record to downstream client systems.

Match/Merge Subsystem of NIC 34

Figure 5:
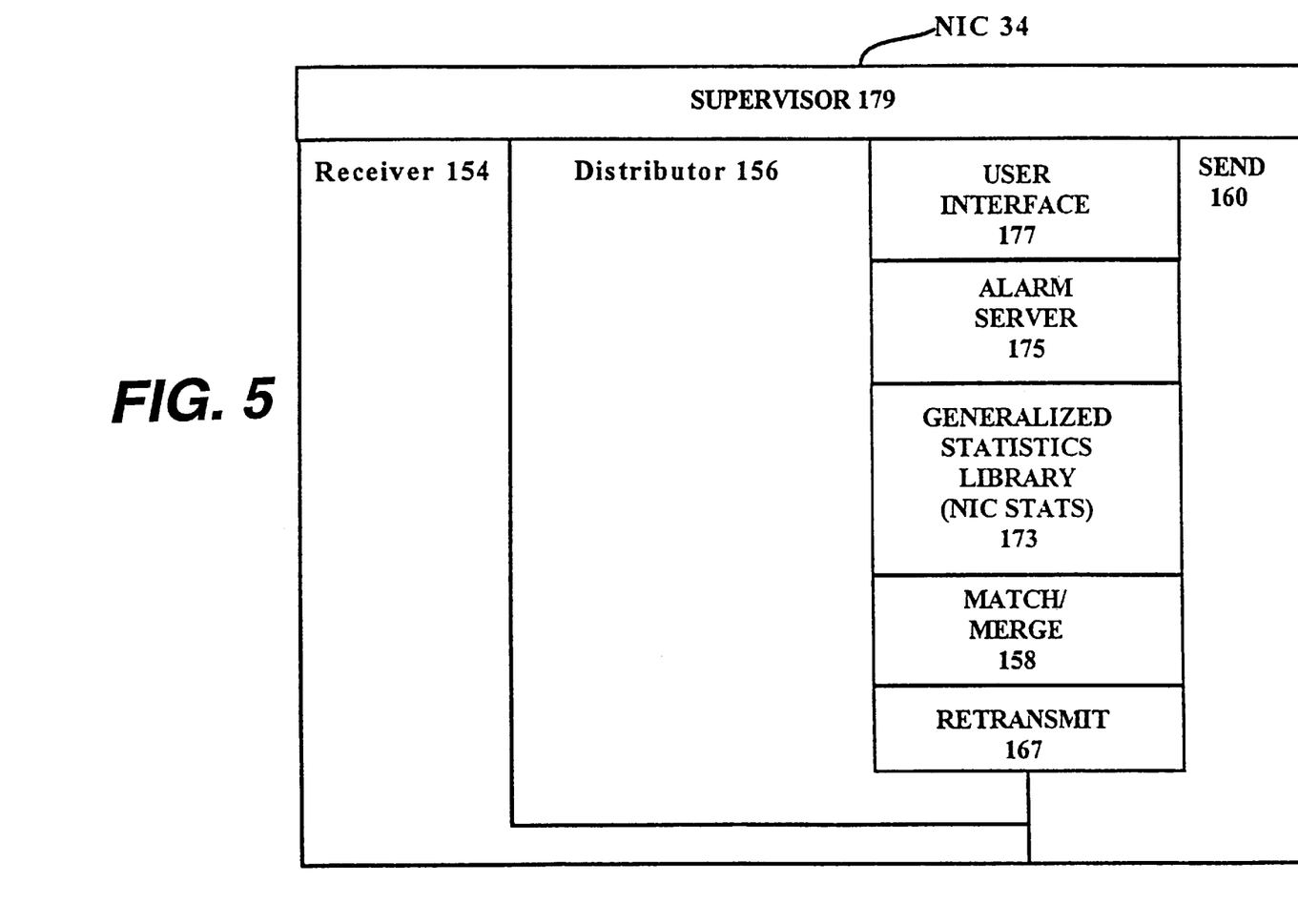
FIG. 5 is a block diagram of the subsystems included in the NIC.

FIG. 5 is a block diagram of the architecture which shows the NIC 34 in greater detail. Although the NIC is shown as a single functional unit, it is, in fact, a distributed processor, such as a cluster of IBM RS 6000 units Model R24. The NIC is dealt with in still greater detail in co-pending patent application Ser. No. 08/426,256 and is incorporated by reference herein. The NIC 34 collects call record data from the network involved in the path of a call. The call records are input to a receiver section 154 of the NIC.

The receiver section provides the necessary handshaking signals with the various network elements to effect data input to the NIC. The succeeding NIC section, namely the distributor 156, identifies the type of record being processed. A processor 158 of the NIC performs a match/merge operation of records generated by network elements. As a result, when a particular call is handled by various elements in the network, the call records are merged by the match/merge 158 so that they may be forwarded downstream as a matched record to a downstream billing platform (not shown). In order to complete a communication path between the match/merge section 158 and a billing platform, a send section 160 of the NIC 34 communicates call records to that platform via line 178.

Data Flow for the Match/Merge Subsystem

Figure 6:
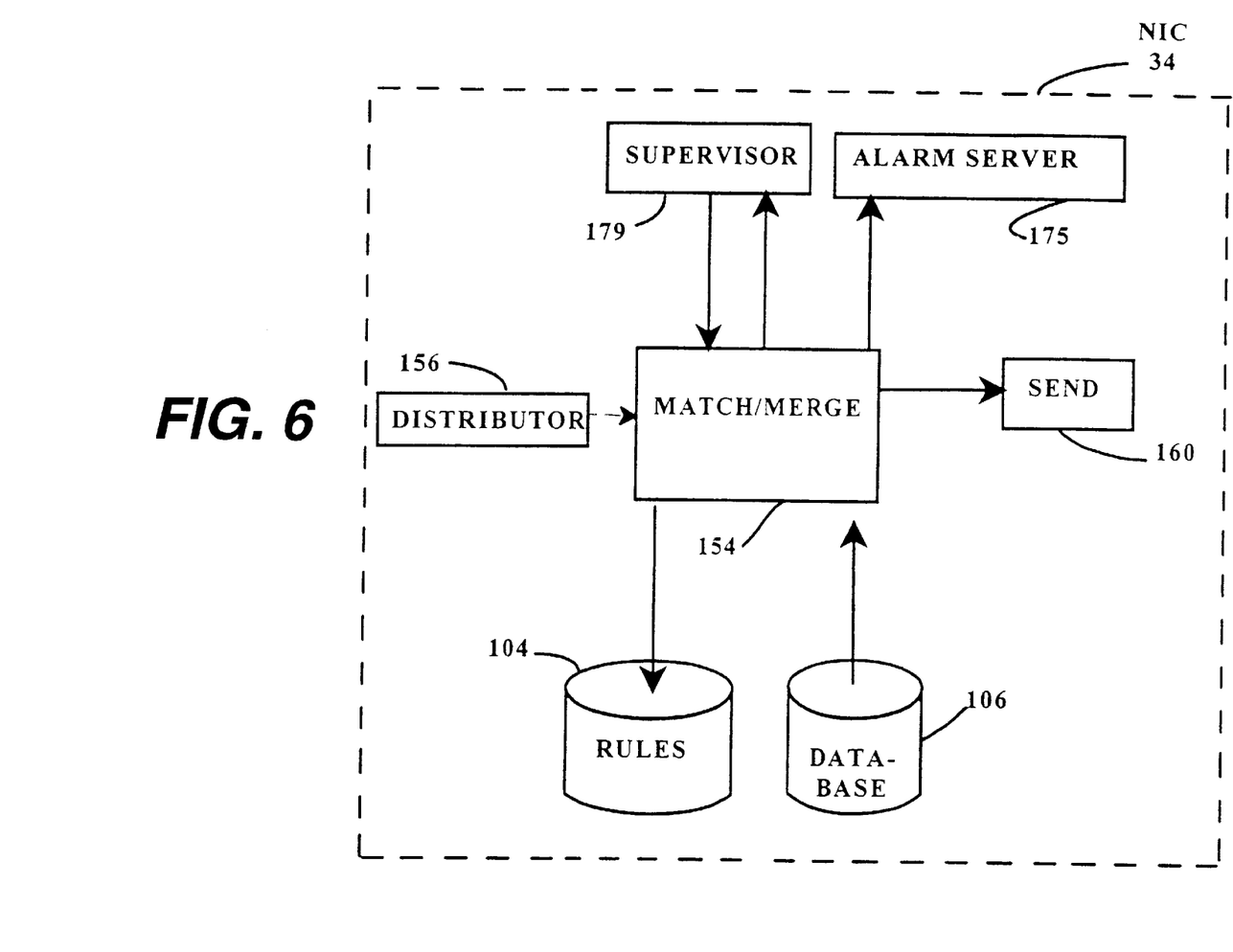
FIG. 6 is a data flow diagram of the match/merge process performed by the NIC.

FIG. 6 illustrates the data flow diagram for the NIC match/merge subsystem 158. The primary purpose of this subsystem is to match switch Call Records (CDR), operator service record (OSR) with billing data record (BDR) elements of the same type of call. For example, an operator assisted long distance call has two types of billing records produced from two separate platforms. The match/merge subsystem concatenates (merges) the elements for downstream billing applications. The distributor 156 sends Call Detail Records (CDRs), operator service records (OSRs) and billing data records (BDRs) to the match/merge subsystem. The CDRs originate at switches 14, 35 (FIG. 1). The OSRs originate at network switches 26 (FIG. 1) and the BDRs originate at the ISN 28 (FIG. 1). The match/merge subsystem matches elements of these respective records for the same call and merges them for passage downstream to billing applications. The database 106 stores database records on a hard drive. Key fields in CDRs, OSRs and BDRs records generate a hash key for insertion in the database. Hash keys pointing to the same location is indicative of a match. In actual implementation of the present system, the database may be an object-oriented database, such as marketed by the Versant Corporation of Menlo Park, Calif.

BDR drop rules are read from a rules file on hard disk 104. NIC event records (NER) reporting rules (i.e., interval) to the supervisor 179 are also read from the rules file. The match/merge subsystem sends unmatched data records to the send subsystem 160.

Process Flow for the Match/Merge Subsystem

Figure 7:
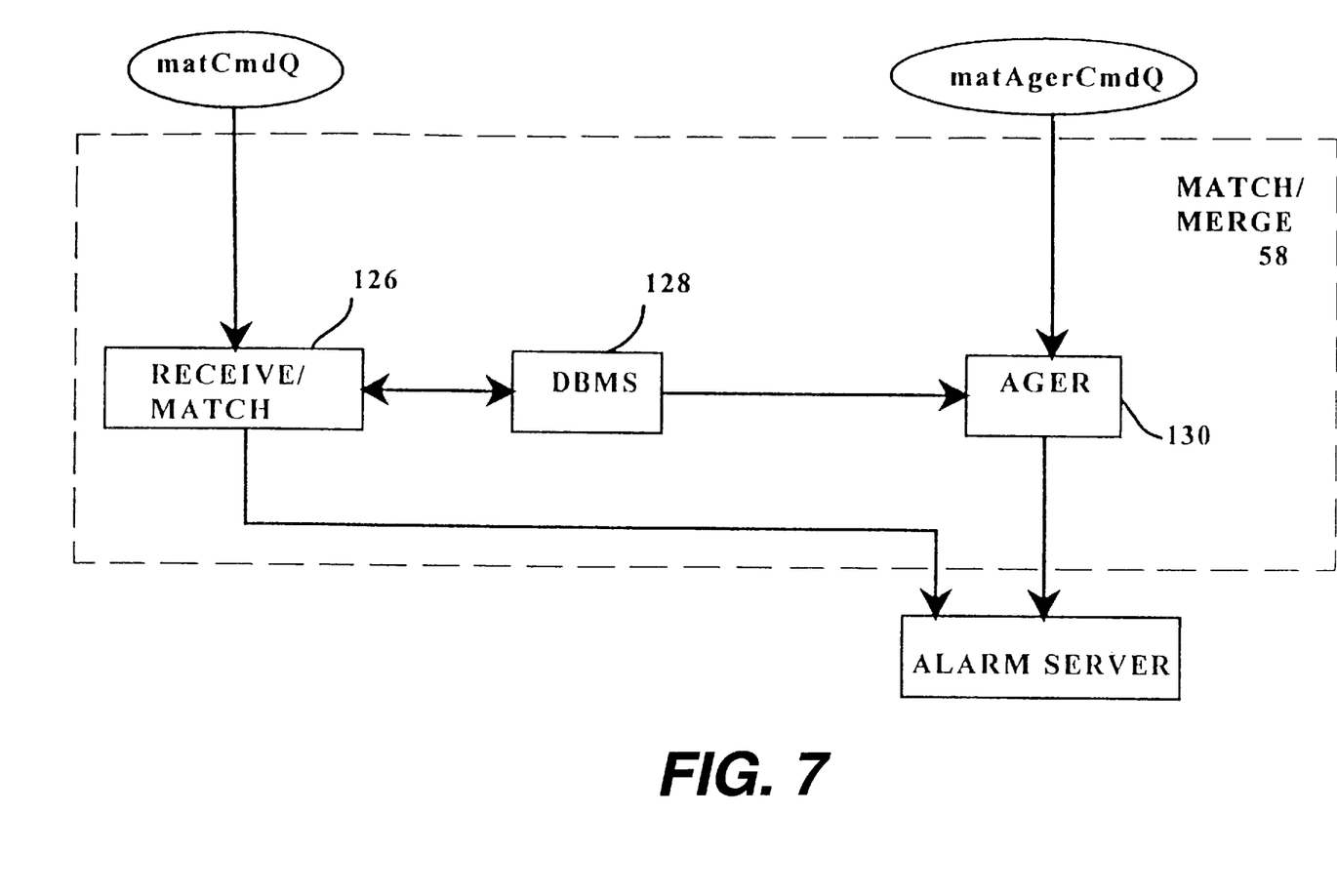
FIG. 7 is a function flow diagram of the match/merge process carried out by the NIC.

As shown in FIG. 7, the match/merge subsystem 158 consists of two main processes: The receive/match process 126 and the ager process 130. The supervisor will start the receive/match and ager processes. The receive/match process will communicate with the supervisor, the distributor, and send subsystems. The ager process will communicate with the supervisor and send subsystems. The supervisor will send shutdown messages to the receive/match and ager processes through queues named matCmdQ and matAgerCmdQ. The two match/merge processes will shutdown on the receipt of a shutdown message. The supervisor will receive two NERs, one from the receive/match process and one from the ager process. Processing errors will generate alarms which are transmitted to the alarm server. Match/merge will send status NERs to downstream hosts (not shown) every time it is initialized or shutdown. Match/merge will also indicate to downstream hosts when it detects an anomaly that could possibly result in an inaccurate NER. When the matched/aged NERs are created, the data type field of common API will indicate that the data is inconsistent.

The receive/match process 126 of the match/merge subsystem (FIG. 8) includes four major functions: receive 132, match 134, concatenate 138, and statistics 136. The receive function will receive BDRs and CRs from the distributor through matInputQ queue. After validating the records it will pass them on to the match function. The match function will attempt to match the BDR/OSR with its corresponding E/P/EP/OSR/BDR. If a match is found the records are combined in the concatenate function and sent to the send subsystem by the SndFromMatQ queue. If no match is found, the records are stored in the data base. The statistics function uses the Generalized Statistics Library (GSL) (FIG. 5) to keep the following counts: BDRs received, BDRs dropped (with reason code), BDRs matched, E/P/EP/OSRs received, E/P/EP/OSRs dropped (reason), and E/P/EP/OSRs matched. These counts will be sent to the supervisor through the supAdminInputQ queue. The following discussion will elaborate upon the individual function modules.

Figure 8:
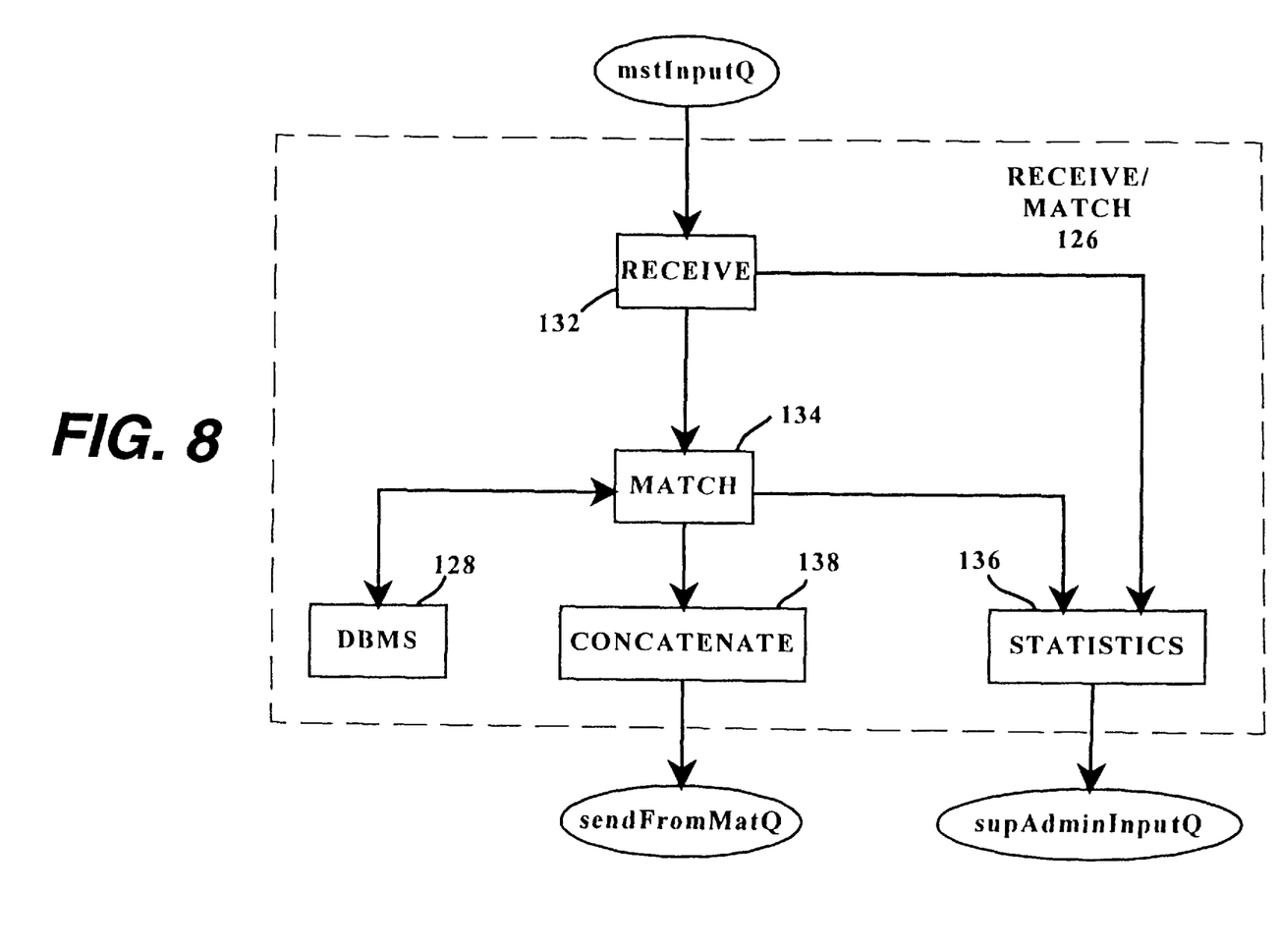
FIG. 8 is a function flow diagram of a receive/match process, as conducted by the NIC.

The receive module 132 will receive the BDRs/OSRs from the distributor and drop the message if the data type field of the API header is not valid and inform the alarm server. In the case of a valid BDR/OSR, each BDR/OSR record will be extracted and a routine will be called to count the received BDR/OSR record. Some fields of the BDR record will be examined to check its match ability. If the record is found to be unmatchable, it will be dropped and a routine will be called to count the dropped BDR with a specific drop code.

The match module 134 will attempt to match BDR/OSR with its corresponding E/P/EP/OSR/BDR stored in the DBMS 128. It will generate a unique key from the four matching fields (Accounting Office, Site number, Operator position and Call Id.) using a hash function. If the duplicate key exists in the same record type, the record will be dropped and the GSL routine will be called to generate a drop count with a reason code indicating a duplicate. Otherwise, the key will be used to find the matching BDR or E/P/EP/OSR from the DBMS 128 (database management system). If any match is found, the record will be retrieved from the DBMS and the GSL routine will be called to increment the appropriate matched E/P/EP/OSR/BDR counters. In the case of a no-match, the record will be stored in the DBMS.

The concatenate module 138 will concatenate the matching E/P/EP/OSR and the BDR to generate a MOSR record. The appropriate position of the BDR record in the MOSR format will be adjusted depending on the size of the E/P/EP/OSR record.

The Statistics module 136 will be executed periodically to generate a consolidated report of all the following counters: BDRs received, BDRs dropped (with reason code), BDRs matched, E/P/EP/OSRs received, E/P/EP/OSRs dropped (reason), and E/P/EP/OSRs matched. The generated report will be appropriately formatted and sent to the supervisor admin. subsystem.

Figure 9:
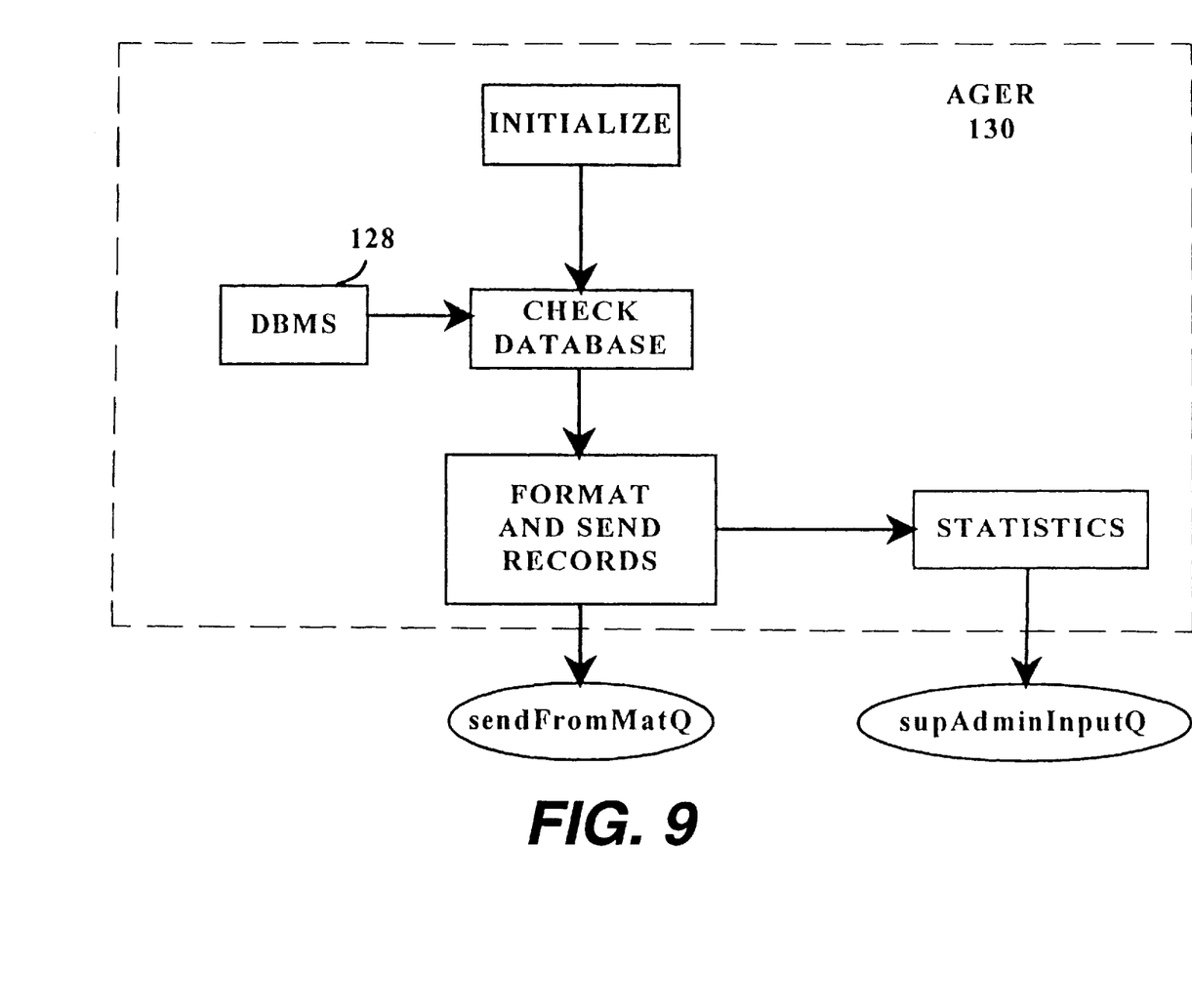
FIG. 9 is a function diagram of an ager process, as performed by the NIC.

FIG. 9 illustrates the flow within the ager process 130, initially shown in FIG. 7. The remaining boxes shown in FIG. 9 indicate initialization and database checking to examine the database BDR and CR records and determine which records have resided there longer than the aged time limit. The box indicating format and send records functions block aged unmatched BDR and CR records. The statistics module is executed periodically to generate a consolidated report regarding aged unmatched records. The ager process will periodically examine the records in the data base and determine whether they have resided there for a specified amount of time. Aged unmatched BDRs and aged unmatched E/P/EP/OSRs will be flushed from the database to the Send subsystem through SndFromMatQ. The statistics function uses GSL to keep the following counts: aged unmatched BDRs and aged unmatched E/P/EP/OSRs. Reports of these counts will be sent to the supervisor through the supAdminInputQ queue.

It should be understood that the invention is not limited to the exact details of construction shown and described herein for obvious modifications will occur to persons skilled in the art.

We claim:

1. In a network having multiple network elements that affect transmission of a call between origination and terminal points, a system for constructing a single network record, the system comprising:

means for creating a data buffer, at a first network element, that processes the call from an origination point;

means for routing the call between the origination point and a plurality of network elements;

each network element that receives the routed call incrementing a count in a portion of the Record Count Section of the buffer;

a terminal switch for connecting the routed call to a terminal point and creating a single call disposition message with finalized counts in the Record Count Section of the buffer;

means for transferring the call disposition messages to a network information concentration means to inform the latter as to the finalized counts, corresponding to the number of call records it will receive from network elements participating in a call; and means for subsequently transferring actual call records from the participating network elements to the network information concentration means for merger of records into a single network record.

2. The single network record construction system set forth in claim 1 further comprising means connected from an output of the terminal switch to the network information concentration means, for transmitting to the concentration means, call disposition messages, each of which includes a completed Record Count Section indicating the number of records to be received by the network information concentration means from the network elements participating in the call.

3. The single network record construction system set forth in claim 1 further comprising means connected between each network element and the network information concentration means for transmitting the actual call records from each element to the network information concentration means.

4. The single network record construction system set forth in claim 1 further comprising an originating network element which creates a network call identifier for each call, that is passed to each network element participating in a call, thereby permitting the network elements to incorporate the network call identifier in records they produce.

5. The single network record construction system set forth in claim 4 wherein the network information concentration means merges records created at the network elements bearing the same network call identifier.

6. A method for constructing a single network record from various call records created by network elements, the method comprising the steps:

creating a data buffer at a first network element that processes the call from an origination point;

routing the call between the origination point and a plurality of network elements;

each network element that receives the routed call incrementing a count in a portion of the Record Count Section of the buffer;

connecting a call to a terminal point and creating a single call disposition message with finalized counts in the Record Count Section of the buffer;

transferring the call disposition messages to a network information concentrator, to inform the latter as to the finalized number counts, corresponding to the number of call records it will receive from network elements participating in a call; and subsequently transferring actual call records from the participating network elements to the network information concentrator for merger of the records into a single network record.

7. The single network record construction method set forth in claim 6 further comprising the step of connecting an output of the terminal switch to the network information concentrator for transmitting thereto call disposition messages, each of which includes a completed Record Count Section indicating the number of records to be received by the network information concentrator from the network elements participating in the call.

8. The single network record construction method set forth in claim 6 further comprising the step of connecting each network element and the network information concentrator for transmitting the actual call records from each element to the network information concentrator.

9. The single network record construction method set forth in claim 6 further comprising the step of creating a network call identifier at an originating network element, for each call, the identifier being passed to each network element participating in a call, thereby permitting the network elements to incorporate the network call identifier in the records they produce.

10. The single network record construction method set forth in claim 9 together with the step of merging, at the network information concentrator, the records created at the network elements bearing the same network call identifier.

* * * * *